(No Model.)
D. BROOKS, Jr.
MEANS FOR INTRODUCING INSULATING MATERIAL INTO CONDUITS.
No. 519,171. Patented May 1, 1894.
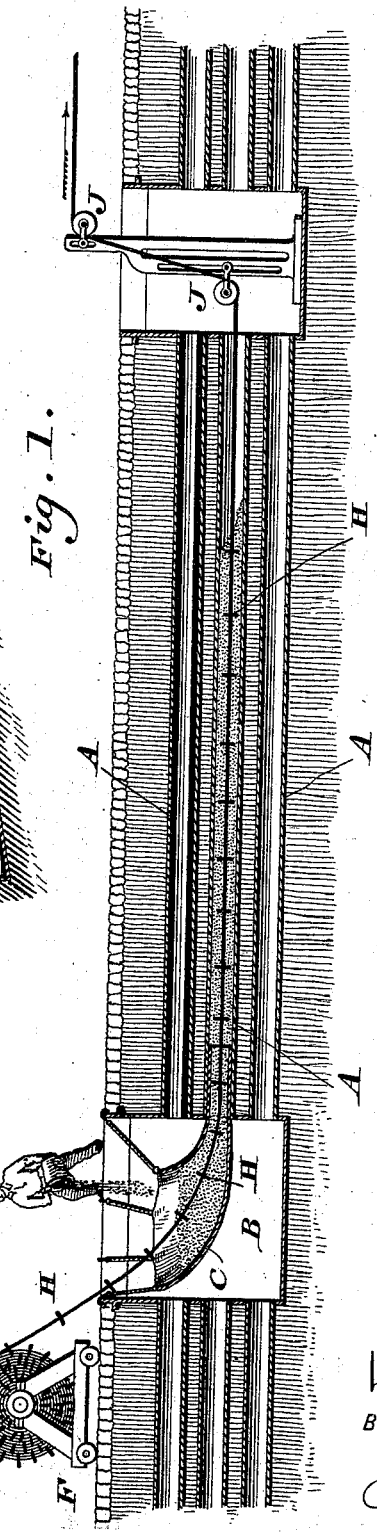
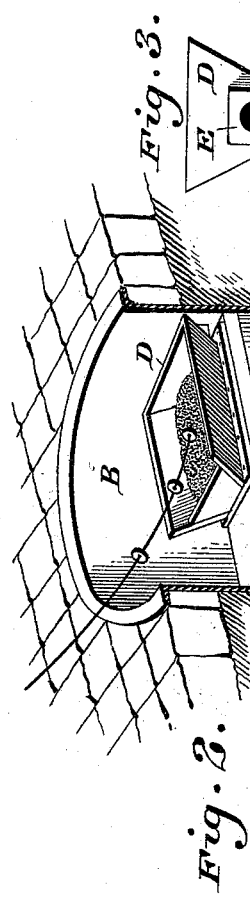
WITNESSES:
P. H. Eagle.
L. Douville.
INVENTOR
David Brooks Jr.
BY
John A. Wiedersheim
ATTORNEY.

UNITED STATES PATENT OFFICE.

DAVID BROOKS, JR., OF PHILADELPHIA, PENNSYLVANIA, ASSIGNOR TO THE ELECTRIC CABLE CONSTRUCTION AND MAINTENANCE COMPANY, OF PENNSYLVANIA.

MEANS FOR INTRODUCING INSULATING MATERIAL INTO CONDUITS.

SPECIFICATION forming part of Letters Patent No. 519,171, dated May 1, 1894.

Application filed November 23, 1892. Serial No. 452,891. (No model.)

*To all whom it may concern:*

Be it known that I, DAVID BROOKS, Jr., a citizen of the United States, residing in the city and county of Philadelphia, State of Pennsylvania, have invented a new and useful Improvement in Means for Introducing Insulating Material into Conduits, which improvement is fully set forth in the following specification and accompanying drawings.

My invention consists of novel means for conveniently introducing insulating material into underground conduits for electric wires, cables or conductors, the same embodying a receptacle open at top, suspended within the manhole of the conduit and communicating with the conduit, so that the insulating material may be poured directly into said receptacle in the manhole, while the reel which is not within the material is not liable to clog, nor its convolutions to adhere, as in other cases, as will be hereinafter set forth.

Figure 1 represents a longitudinal vertical section of a device for introducing insulating material into underground conduits for electric wires, embodying my invention. Fig. 2 represents a perspective view of a modification thereof. Fig. 3 represents an end view of a portion of the device shown in Fig. 2.

Similar letters of reference indicate corresponding parts in the several figures.

Referring to the drawings: A designates a number of underground conduits or subways for electric wires or cables, and B designates a manhole in communication therewith.

C designates a hopper which is placed in the manhole and has its discharge end inserted into one of the conduits, the mouth of the hopper being above, so that insulating material may be poured thereinto. The hopper is made of suitable material, (canvas or other fabric being preferred) and it is suspended from the top of the manhole by means of cords or hooks, so that it may be readily removed, packed and transported and afterward opened and located. In Fig. 2, the hopper C is of box form, supported on a suitable bench or ledge in the manhole, and having a discharge opening E, which is placed in communication with a conduit.

F designates a reel on which is wound a piece of rope, chain or other conveyer G, with heads H thereon at intervals, said rope being passed through the hopper into the conduit and run off from the reel, whereby the heads carry the insulating material from the hopper into said conduit, and distribute the same, so that the inner wall of the conduit is coated with said insulating material. The greater mass of the material is drawn through the conduit by the heads so as to leave a central space for the cables or wires, which are subsequently passed through the conduit. After the conveyer leaves the conduit at the next manhole it may be directed by suitable guide pulleys J to the reel outside of said manhole and wound thereon, or introduced into another hopper and conduit, whereby the latter is supplied with material as in the previous case, and thus the operations may be continued until the several conduits are supplied.

I am aware that it is not new to place a reel in a tank or receptacle, whereby the same rotates within the material, and said tank is above ground, but in my case, the open-mouth receptacle is within the manhole, the reel is entirely outside of the same, whereby the material may be conveniently poured into said receptacle, without the necessity of raising it, as in the case of a tank above the ground, and the reel is not liable to clog, nor the convolutions of the conveyer chain or rope to stick together, especially when the material is at rest and thickens, or the conveyer is not running. Furthermore, in my case the conveyer passes through the material from top to bottom, and thus effectively carries the material through the receptacle into the conduit.

Having thus described my invention, what I claim as new, and desire to secure by Letters Patent, is—

1. An open-mouthed receptacle suspended within a manhole of a conduit, and communicating with the conduit, a reel outside of said receptacle, and a conveyer leading from said reel through the top of the receptacle to the conduit, said parts being combined substantially as described.

2. In a device substantially as described, a conduit having a manhole, in combination with the flexible receptacle open at top and communicating at bottom with the conduit, and means connected with the receptacle for suspending the latter within said manhole, as set forth.

DAVID BROOKS, JR.

Witnesses:
JOHN A. WIEDERSHEIM,
A. P. JENNINGS.